United States Patent
Bakx et al.

(10) Patent No.: US 7,830,757 B2
(45) Date of Patent: Nov. 9, 2010

(54) TRACKING CONTROL METHOD FOR READING/WRITING OPTICAL DISK

(75) Inventors: Johannes Leopoldus Bakx, Eindhoven (NL); Stefan Geusens, Eindhoven (NL); Antoon Dekker, Eindhoven (NL)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 535 days.

(21) Appl. No.: 11/691,496

(22) Filed: Mar. 27, 2007

(65) Prior Publication Data

US 2008/0239894 A1    Oct. 2, 2008

(51) Int. Cl.
*G11B 7/00* (2006.01)
(52) U.S. Cl. ................................... 369/44.29
(58) Field of Classification Search ............ None
See application file for complete search history.

(56) References Cited

U.S. PATENT DOCUMENTS

| | | | | |
|---|---|---|---|---|
| 5,023,857 A | * | 6/1991 | Verboom | 369/44.25 |
| 5,181,195 A | * | 1/1993 | Kume et al. | 369/44.41 |
| 5,703,849 A | * | 12/1997 | Noda | 369/44.29 |
| 6,266,304 B1 | * | 7/2001 | Nagano et al. | 369/44.32 |
| 2003/0137907 A1 | * | 7/2003 | Kitayama et al. | 369/44.32 |
| 2003/0169649 A1 | * | 9/2003 | Takaoka et al. | 369/44.26 |

FOREIGN PATENT DOCUMENTS

JP       02265030 A   * 10/1990

* cited by examiner

*Primary Examiner*—William J Klimowicz
*Assistant Examiner*—Mark L Fischer
(74) *Attorney, Agent, or Firm*—WPAT, PC; Justin King

(57) ABSTRACT

In a tracking control method for use in an optical disk drive to read/write an optical disk, an open-loop tracking control operation of the optical disk drive is first performed according to an input tracking error signal and a predetermined periodical offset to generate a dynamic offset. Afterwards, a closed-loop tracking control operation of the optical disk drive is performed according to the input tracking error signal calibrated with the dynamic offset.

6 Claims, 6 Drawing Sheets

TRACKING CONTROL METHOD FOR READING/WRITING OPTICAL DISK

FIELD OF THE INVENTION

The present invention relates to a tracking control method for use in an optical disk drive to read/write an optical disk, and more particularly to a tracking control method when a single-spot tracking method is applied to the optical disk drive to read/write an optical disk.

BACKGROUND OF THE INVENTION

When an optical head of an optical disk drive operates, the light emitted by a light source such as a laser diode is focused by an object lens of the optical head on an optical disk, and the light reflected by the optical disk is transmitted to a light sensor to realize information from the disk. The optical head 10 moves along two main directions, i.e. a direction perpendicular to the disk face, referred as a focusing direction F, and a direction parallel to the disk face, referred as a tracking direction T, as shown in FIG. 1.

Referring to FIG. 2, a conventional tracking control system 1 of an optical disk drive is schematically shown. The optical disk 110 is driven to rotate by a spindle motor 120. For reading/writing the rotating disk, the optical head 10 is driven to move in the tracking direction or radial direction T by a sled motor 130 to perform a seeking operation. Further, the optical head 10 is driven to move in the tracking direction T by a tracking coil 140 to perform a tracking operation. The term "tracking operation" used herein means that the position of the optical head with respect to a selected track is aligned with a proper center position of the selected track. The term "seeking operation" means that the optical pickup head jumps from one track to another track. When an electronic signal is generated responsive to the optical signal reflected from the optical disk 110 and received by the optical head 10, the electronic signal is transmitted to a radio frequency (RF) amplifier 150 to be processed into a radio frequency signal RF and a tracking error signal TE. The radio frequency signal RF and the tracking error signal TE are further processed by a digital signal processor (DSP) 170 to generate two control signals TRO and FMO. In response to the control signals FMO and TRO, a motor actuator 160 makes adjustments to output driving forces for driving the sled motor 130 and the tracking coil 140, thereby properly locating the optical pickup head 10 onto the desired track. For example, the control signal TRO facilitates tracking control of the tracking coil 140 by way of the motor actuator 160.

In general, the amplitude of the tracking error signal TE represents the tracking error amount of the optical pickup head 10. The tracking error signal TE is controlled by the closed-loop control system including the optical head 10, the radio frequency (RF) amplifier 150, the digital signal processor (DSP) 170, the motor actuator 160 and the tracking coil 140. In response to the tracking error signal TE, the control signal TRO is adjusted by the digital signal processor (DSP) 170 so as to precisely locate the optical head 10 onto the desired track.

Typically, a photo detector of an optical disk drive has main-beam light receiving parts 31 and satellite-beam light receiving parts 32 disposed at opposite sides of the main-beam light receiving parts 31. The generation of the radio frequency signal RF and the tracking error TE signal can be implemented by way of single-spot detection that detects only the light reflected from the main-beam light receiving parts 31 or triple-spot light detection that further incorporates effects of the satellite-beam light receiving parts 32.

Generally speaking, triple-spot tracking methods are advantageous over conventional single-spot tracking methods due to improved precision. Conventional single-spot tracking methods suffer from some problems. One of the examples is the offset in the tracking error signal TE that occurs in case that the spot is not perfectly aligned with the detector. Due to the alignment error Δ (also referred to as a beamlanding error), a static offset will occur in the tracking error signal (TE=L-R), wherein L and R respectively indicates signals generated by left and right portions of the main-beam light receiving parts 31, as shown in FIG. 3. The beamlanding error can be due to a misalignment of the photo detector, the position of which has always a certain tolerance and which may slightly drift in the course of time. The total static offset due to detector misalignment can easily be 200% and more. The beamlanding error caused by lens shift is another key factor resulting in the alignment error Δ. If the position of the objective lens changes, e.g. due to tracking of the disk's eccentricity, or during seeking due to acceleration and deceleration forces, the position of the spot on the detector will also change, with a factor given by the design of the light path. This results in dynamical beamlanding, and consequently in a dynamical offset, i.e. the dynamical offset in the tracking error signal TE that changes in time. The parameters of typical optical heads and media are such that this dynamical beamlanding due to lens shift cannot be ignored when using single-spot tracking methods.

Another problem that must be solved is that the system has to cope with transitions between blank and written areas, and between read and write mode. If the offset is compensated in one mode, one needs to make sure that offset compensation is still valid in another mode. For example, when the spot moves from a blank to a written area, no offset should suddenly be introduced in the tracking error signal.

Although triple-spot tracking methods are more popular than conventional single-spot tracking methods for the above reasons, there are still some limitations. For example, the triple-spot tracking methods could not be used on dual-layer BD-R/RE media due to interlayer crosstalk. The main beam returning from the other layer interferes with the satellite beams from the target layer, which causes large disturbances in the satellite signals contributing to the tracking error signal. This problem implies that for dual-layer BD media the drive should restore to single-spot tracking, where only the main beam is used as tracking information for the tracking servo loop.

SUMMARY OF THE INVENTION

Therefore, the present invention is to provide a tracking control method using a single-spot tracking method while alleviating or preventing from the problems encountered by the conventional single-spot tracking methods by way of firmware additions and modifications. The present invention can be used for dual-layer BD-R/RE media, and any other suitable media and drives.

The present invention relates to a tracking control method for use in an optical disk drive to read/write an optical disk, which includes steps of: providing a periodical offset specific to the optical disk; performing an open-loop tracking control operation of the optical disk drive according to an input tracking error signal and the periodical offset to generate a dynamic offset; and performing a closed-loop tracking control operation of the optical disk drive according to the input tracking error signal calibrated with the dynamic offset.

In a embodiment, the method further includes steps of measuring an average tracking error signal according to the input tracking error signal; and subtracting the average tracking error signal from the input tracking error signal to be used as the input tracking error signal for generating the dynamic offset. The average tracking error signal, for example, can be obtained by processing the input tracking error signal with a peak detector or a low-pass filter.

In an embodiment, the input tracking error signal is calibrated by subtracting therefrom the dynamic offset.

In an embodiment, the method further includes steps of measuring an average tracking error signal according to the input tracking error signal; and further calibrating the input tracking error signal by subtracting therefrom the average tracking error signal.

In an embodiment, the method further includes steps of adjusting the calibrated tracking error signal with a frequency compensator and loop gain element into a actuator control signal; converting this actuator control signal into a lens shift of the optical head with a model of an optical head actuator of the optical disk drive; converting the lens shift into a dynamical beamlanding offset with a conversion factor; and further calibrating the input tracking error signal by subtracting therefrom the dynamical beamlanding offset.

In an embodiment, the periodical offset are low frequency periodical disturbances inherent in the optical disk and predetermined by an open-loop tracking control operation of an optical head of the optical disk drive.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Hereinafter, tracking control means implemented in the digital signal processor (DSP) according to an embodiment of the present invention will be illustrated.

Figure 1:
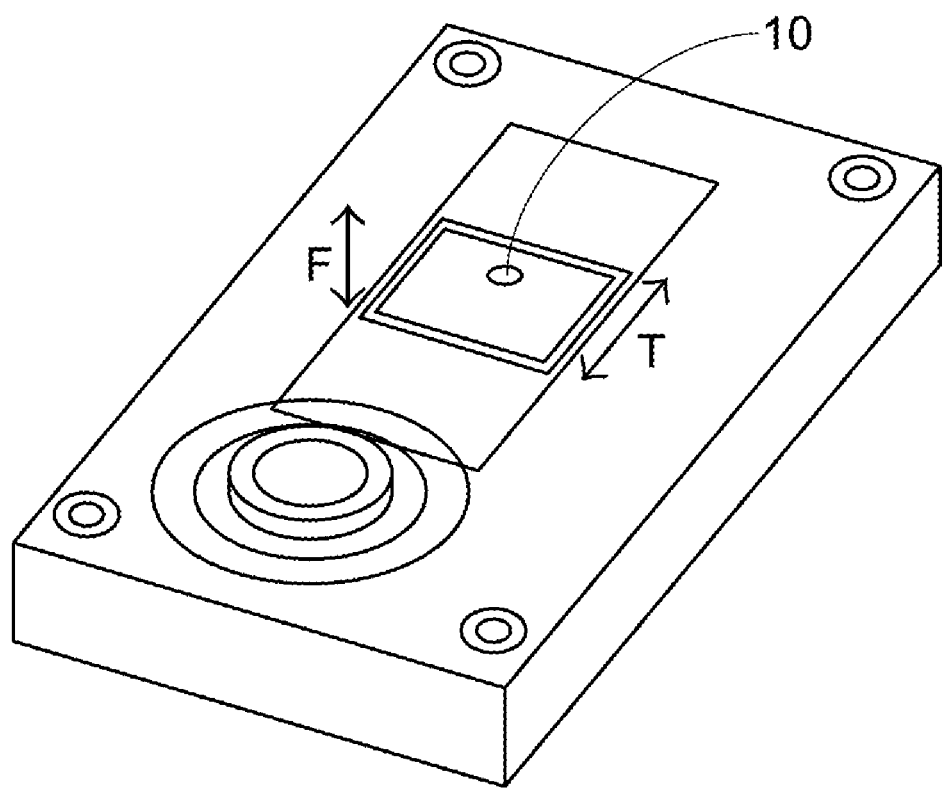
FIG. 1 is a schematic diagram illustrating a typical optical head.
Figure 2:
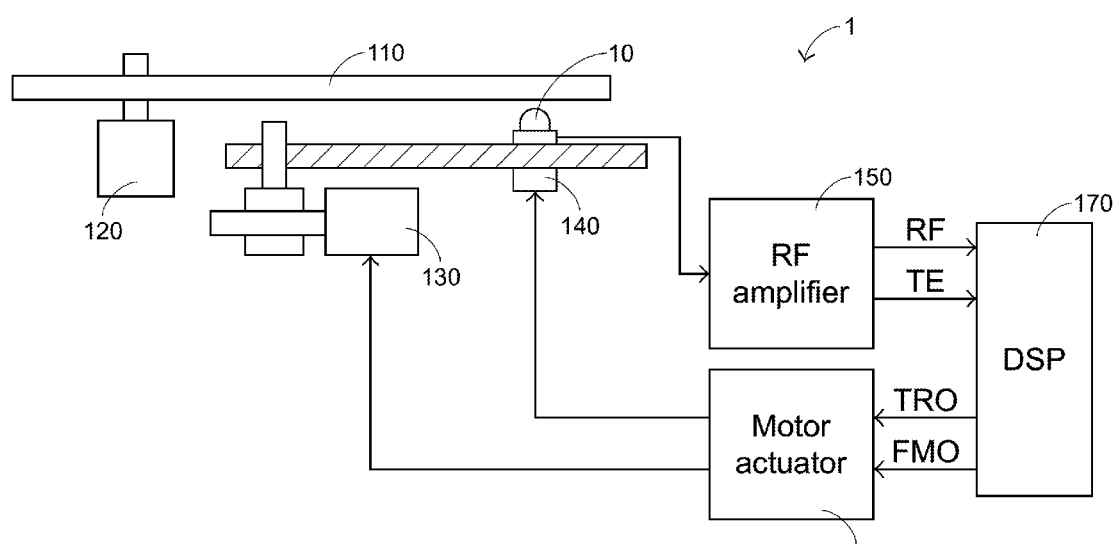
FIG. 2 is a functional block diagram illustrating a typical tracking control system of a disk drive.
Figure 3:
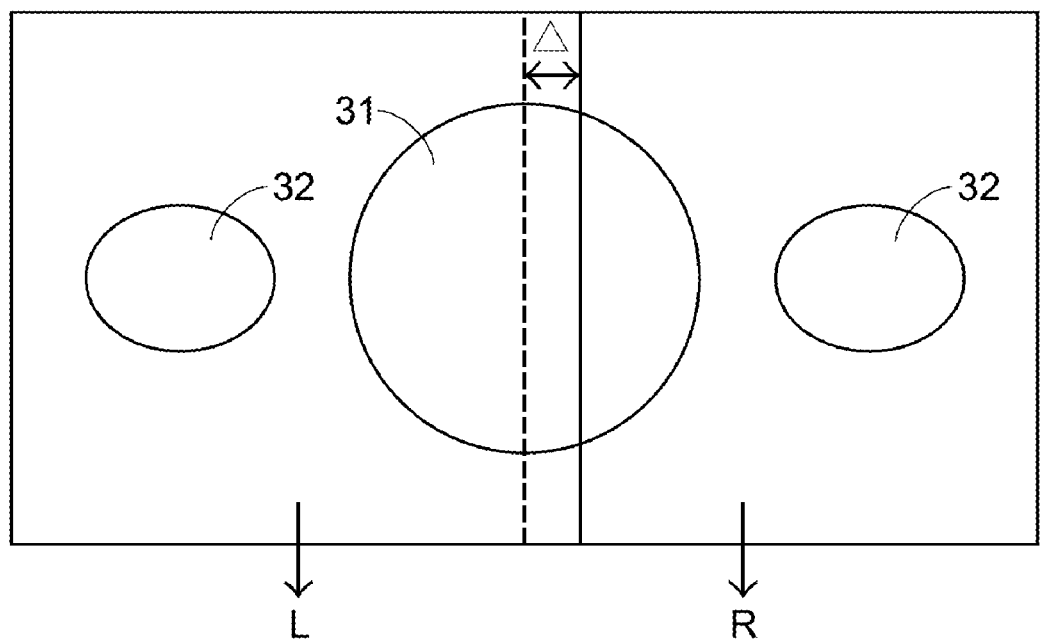
FIG. 3 is a schematic diagram showing detector area including main-beam light receiving parts and satellite-beam light receiving parts, and also showing a possible misalignment error.
Figure 4:
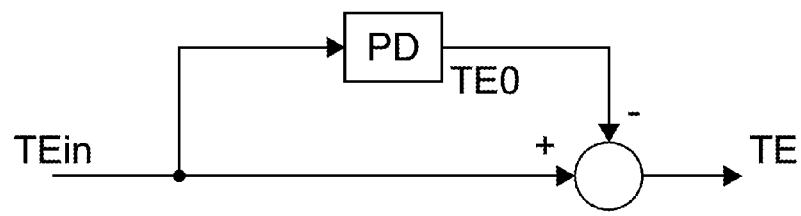
FIG. 4 is a scheme illustrating static offset calibration of a tracking control method according to an embodiment of the present invention.
Figure 5:
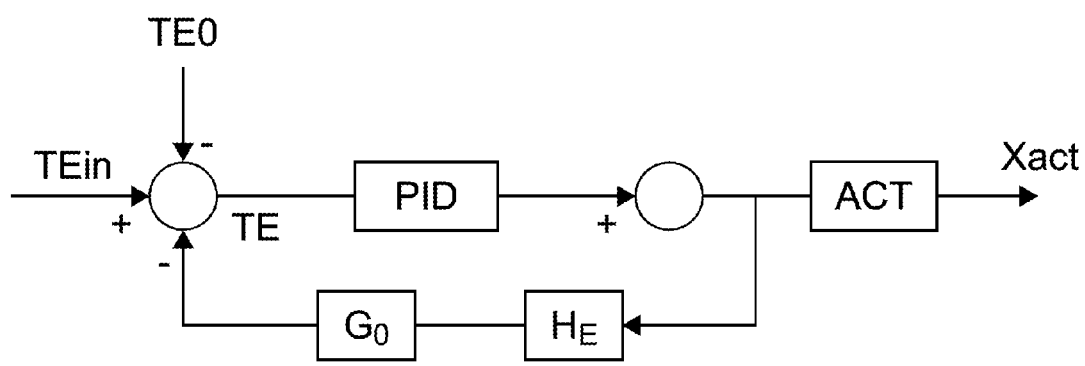
FIG. 5 is a scheme illustrating a tracking servo loop of a tracking control method for dynamical offset calibration according to an embodiment of the present invention.

First the static offset is calibrated as illustrated in FIG. 4 by using a peak-detector circuit. The peak-detector PD measures the peaks and bottoms of the input tracking error signal TEin in an open-loop manner, and finds the average value TE0, which is subtracted from the input signal. Alternatively, a low-pass filter can be used to find TE0. Afterwards, the tracking servo loop is closed, and dynamical offset correction is performed by feedforward of the actuator voltage, as illustrated in FIG. 5.

The tracking servo is implemented with a frequency compensator-loop, this can be a combination of filters and gain elements having linear or a-linear signal processing. In order to further eliminate the dynamical offset, the actuator (ACT) voltage applied by the servo loop is measured, and converted into an estimated lens shift by using a model $H_E$ of the actuator. The estimated lens shift is converted into an estimated dynamical offset by the conversion factor $G_o$, after which the dynamical offset is subtracted from the input signal. When $H_E$ and $G_o$ are exact, the dynamical offset is perfectly canceled. The DC-sensitivity of $H_E$ and the value of $G_o$ can be combined into a single voltage-to-offset parameter, which is calibrated at startup. The actuator ACT drives the lens to provide a signal Xact representing the position of lens during the tracking operation.

Figure 6:
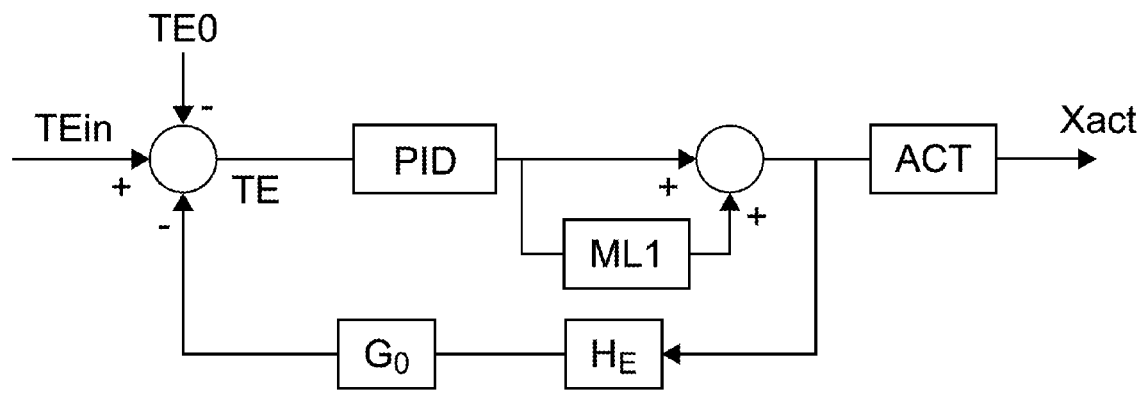
FIG. 6 is a scheme illustrating the enabling of a first memory loop in a tracking control method for further dynamical offset calibration according to an embodiment of the present invention.

Then, as indicated by FIG. 6, a memory loop ML1 is applied in cascade to the PID block of the tracking servo loop. The PID block is composed of a proportional-integral-derivative (PID) control circuit. The memory loop ML1 stores the actuator control signal to compensate low-frequency track errors like eccentricity. After enabling the memory loop ML1, the low-frequency periodical disturbances will be learned and corrected by the output of the memory loop ML1. That is, the correction of these disturbances is gradually taken over by the memory loop ML1 from the PID block. However, the input signal of the actuator ACT is not changing, and therefore the feedforward offset correction will not change either.

Figure 7:
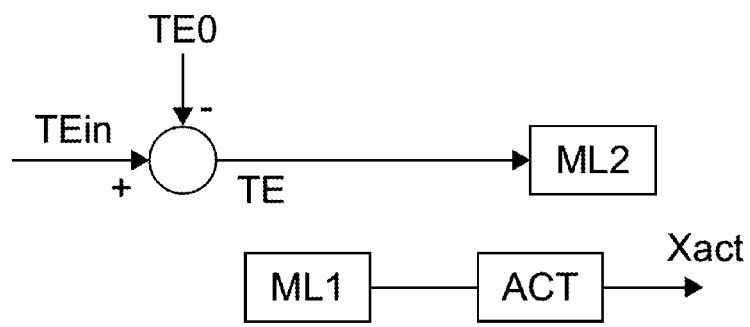
FIG. 7 is a scheme illustrating a learning step of a tracking control method according to an embodiment of the present invention, which obtains parameters to be introduced into the data reading/writing process for well calibrating the dynamical offset.
Figure 8:
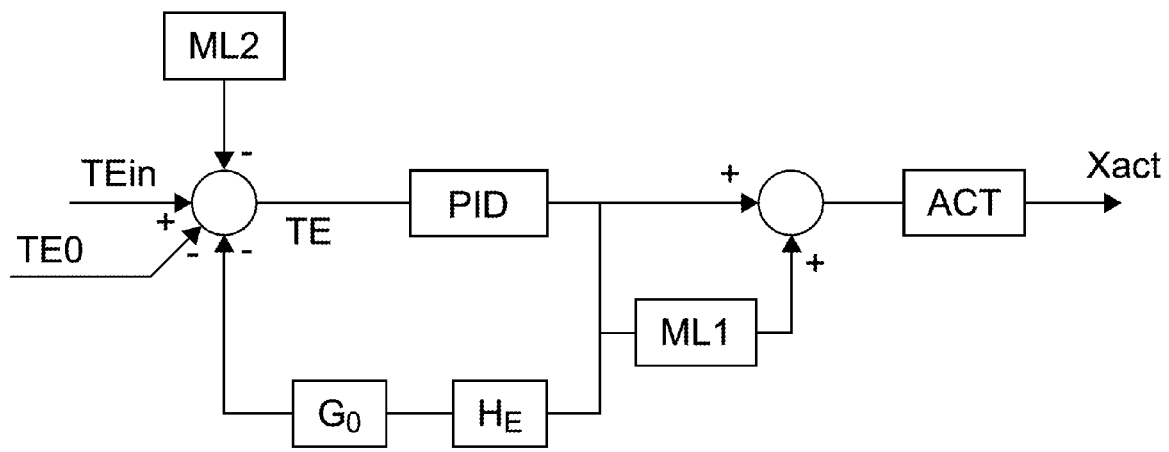
FIG. 8 is a scheme illustrating a tracking control with static and dynamical offset calibration effects according to an embodiment of the present invention.

Afterwards, the tracking loop is opened, while the output of memory loop ML1 remains present, to measure and store further dynamic offset. Please refer to FIG. 7. The actuator ACT now keeps moving as before, i.e. it makes the same low-frequency excursions as in the closed-loop mode. This allows the dynamical offset to be measured and stored in another memory loop ML2. Finally the loop is closed and the dynamical offset is corrected by subtracting the output from the memory loop ML2, as illustrated in FIG. 8. In the final state of the tracking servo loop an additional feedforward offset correction derived from the actuator control signal is present to correct the linearly increasing offset due to tracking a spiral groove. This offset is reset by a sled step. If the sled steps are sufficiently small, this extra branch can be discarded. Afterwards, the disk speed can be increased up to any desired value.

In brief, the present invention finds dynamical offset according to predetermined periodical offset. Then a closed-loop tracking control operation of the optical head of the optical disk drive can be performed with dynamic offset calibration according to the set of periodical offset. Specifically speaking, a feature of the invention is to eliminate the dynamical offset by measuring this offset in an open-loop mode as a function of the disk's azimuth, and subtract it from the original TE signal. The measurement is made possible by first applying a memory loop in a closed loop mode, which learns and stores the actuator driving signal to compensate low-frequency track errors like eccentricity. Then the learned and stored actuator signal is applied in an open-loop mode, which lets the actuator move as if tracking the disk. In this mode the dynamical offset of the TE signal can be measured and stored at a sufficient number of positions along the azimuth. Then, after closing the loop again, the offset can be eliminated by subtracting the stored dynamical offset values from the original TEin signal.

An additional feature is to use normalization of the tracking error signal, that is, to divide the tracking error signal TE=L−R by the sum signal CA=L+R in order to keep the compensating offset value valid through blank/written and read/write transitions.

The present invention allows the use of single-spot tracking whenever 3-spot tracking is impossible or inconvenient. The single-spot method solves the problem of coherent interference that disturbs the tracking error of the 3-spot method on dual-layer BD media. An additional advantage of the single-spot tracking method is that it does not need a grating to generate satellite beams, and hence saves cost with respect to the 3-spot tracking method. Yet another advantage is that for the single-spot method more power is available than for the 3-spot method, as no power is required for satellite spots.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tracking control method for use in an optical disk drive to read/write an optical disk, comprising steps of:

measuring a static offset according to an input tracking error signal generated by a detector receiving a single spot reflected from the optical disk;

subtracting the static offset from the input tracking error signal to be a tracking error signal without the static offset;

implementing a tracking servo loop with a frequency compensator-loop;

feeding the tracking error signal without static offset into the tracking servo loop;

using a first memory to learn a periodical offset in the tracking servo loop;

opening the tracking servo loop and driving an actuator by the periodical offset;

using a second memory to learn a dynamical offset according to the periodical offset;

subtracting the static offset and the dynamical offset from the input tracking error signal to be a tracking error signal without the static and dynamical offset; and closing the tracking servo loop and feeding the tracking error signal without the static and dynamical offset into the closed tracking servo loop.

2. The method according to claim 1 wherein the static offset is obtained by processing the input tracking error signal with a peak detector.

3. The method according to claim 1 wherein the static offset is obtained by processing the input tracking error signal with a low-pass filter.

4. The method according to claim 1 wherein the periodical offset indicates low frequency periodical disturbances inherent in the optical disk.

5. The method according to claim 1 wherein the frequency compensator-loop comprises a filter and a gain element.

6. The method according to claim 1 wherein the dynamical offset is measured as a function of the optical disk's azimuth.

* * * * *